(12) United States Patent
Oku et al.

(10) Patent No.: US 10,256,476 B2
(45) Date of Patent: Apr. 9, 2019

(54) FUEL CELL ELECTRODE STRUCTURE, METAL SEPARATOR, FUEL CELL EMPLOYING SAID FUEL CELL ELECTRODE STRUCTURE AND SAID METAL SEPARATOR, AND DIE FOR FABRICATING SAID FUEL CELL ELECTRODE STRUCTURE

(71) Applicant: NISSAN MOTOR CO., LTD., Yokohama-shi, Kanagawa (JP)

(72) Inventors: Takanori Oku, Mississauga (CA); Shinichi Miyazaki, Mississauga (CA); Ryan Blunt, Burnaby (CA)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/736,105

(22) PCT Filed: May 26, 2016

(86) PCT No.: PCT/JP2016/065616
§ 371 (c)(1),
(2) Date: Dec. 13, 2017

(87) PCT Pub. No.: WO2016/203926
PCT Pub. Date: Dec. 22, 2016

(65) Prior Publication Data
US 2018/0183073 A1    Jun. 28, 2018

(30) Foreign Application Priority Data

Jun. 15, 2015 (JP) ................................. 2015-120347

(51) Int. Cl.
*H01M 8/00* (2016.01)
*H01M 8/0206* (2016.01)
(Continued)

(52) U.S. Cl.
CPC ........... *H01M 8/0206* (2013.01); *H01M 8/02* (2013.01); *H01M 8/0247* (2013.01);
(Continued)

(58) Field of Classification Search
CPC ............. H01M 8/0206; H01M 8/0273; H01M 8/0276; H01M 8/0247; H01M 8/1004
See application file for complete search history.

(56) References Cited

U.S. PATENT DOCUMENTS 8,084,165 B2    12/2011    Kusakabe et al.
8,197,990 B2    6/2012    Burdzy et al.
(Continued)

FOREIGN PATENT DOCUMENTS

EP    2 808 929    12/2014
JP    2001-319667 A    11/2001
(Continued)

*Primary Examiner* — Cynthia H Kelly
*Assistant Examiner* — Monique M Wills
(74) *Attorney, Agent, or Firm* — Foley & Lardner LLP

(57) ABSTRACT

A fuel cell electrode structure includes a membrane electrode assembly including an electrolyte membrane between a pair or electrodes, and a frame being integrally formed with the membrane electrode assembly supporting the membrane electrode assembly from the peripheral side.

The membrane electrode assembly includes a gas diffusion layer on the surface, and a sealing member for sealing the periphery of the membrane electrode assembly is provided on the frame.

The sealing member includes a lip portion, and at least partly includes extended portion that extends to the membrane electrode assembly. The extended portion is thinner than the lip portion of the sealing member, and the end face of the extended portion is in contact with the end face of the gas diffusion layer.

11 Claims, 4 Drawing Sheets

(51) Int. Cl.
*H01M 8/02* (2016.01)
*H01M 8/0271* (2016.01)
*H01M 8/0247* (2016.01)
*H01M 8/0273* (2016.01)
*H01M 8/0276* (2016.01)
*H01M 8/1004* (2016.01)
*H01M 8/1018* (2016.01)
*H01M 8/0286* (2016.01)
*H01M 8/10* (2016.01)

(52) U.S. Cl.
CPC ....... *H01M 8/0271* (2013.01); *H01M 8/0273* (2013.01); *H01M 8/0276* (2013.01); *H01M 8/0286* (2013.01); *H01M 8/1004* (2013.01); *H01M 8/1018* (2013.01); *H01M 8/10* (2013.01); *H01M 2008/1095* (2013.01)

(56) References Cited

U.S. PATENT DOCUMENTS

| | | |
|---|---|---|
| 2001/0044042 A1 | 11/2001 | Inoue et al. |
| 2009/0023035 A1 | 1/2009 | Inoue et al. |
| 2009/0136811 A1 | 5/2009 | Kusakabe et al. |
| 2009/0246586 A1 | 10/2009 | Kawabata et al. |
| 2011/0200911 A1 | 8/2011 | Shimazoe et al. |
| 2011/0318665 A1* | 12/2011 | Yamamoto .......... H01M 8/0273 429/469 |
| 2015/0288004 A1* | 10/2015 | Yamamoto .............. C08L 23/16 429/480 |
| 2015/0380694 A1* | 12/2015 | Kadono ................. F16J 15/024 277/644 |

FOREIGN PATENT DOCUMENTS

| | | |
|---|---|---|
| JP | 2003-7328 A | 1/2003 |
| JP | 2003-163015 A | 6/2003 |
| JP | 2007-250248 A | 9/2007 |
| JP | 2007-250249 A | 9/2007 |
| JP | 2008-146955 A | 6/2008 |
| JP | 2012-236556 A | 12/2012 |
| JP | 2014-99316 A | 5/2014 |
| KR | 10-2007-0116681 A | 12/2007 |
| WO | WO 2007/145291 A1 | 12/2007 |

* cited by examiner

FUEL CELL ELECTRODE STRUCTURE, METAL SEPARATOR, FUEL CELL EMPLOYING SAID FUEL CELL ELECTRODE STRUCTURE AND SAID METAL SEPARATOR, AND DIE FOR FABRICATING SAID FUEL CELL ELECTRODE STRUCTURE

TECHNICAL FIELD

The present invention relates to a fuel cell electrode structure. In more detail, the present invention relates to a fuel cell electrode structure that prevents gas from flowing into a space for sealing on the periphery of a membrane electrode assembly, a metal separator, a fuel cell single cell using the fuel cell electrode structure and the metal separator, and a mold for producing the fuel cell electrode structure.

BACKGROUND ART

A fuel cell stack is formed by stacking a plurality of single cells between two end plates and applying a fastening load in the stacking direction by means of fastening bolts and/or a casing. Each of the single cells includes a pair of separators that include corrugated plates and a fuel cell electrode structure which is a membrane electrode assembly integrally formed with a frame and is held between the pair of separators.

The membrane electrode assembly includes an electrolyte membrane and a pair of electrodes disposed on both faces of the electrolyte membrane. Each of the electrodes includes a catalyst layer and a gas diffusion layer formed on the outer face of the catalyst layer. For example, carbon paper or the like with water repellant finish is used as the gas diffusion layer.

Gas channels are formed between the membrane electrode assembly and the corrugated plates along a reaction surface. In order to prevent fuel gas or oxidant gas that are supplied to the gas channels from leaking to the outside or to prevent the fuel gas from being mixed with the oxidant gas, a scaling member is provided on the periphery of the membrane electrode assembly.

Patent Document 1 discloses a membrane electrode structure that is joined on the outer periphery of electrodes, with gaskets that are punched into the approximately same shapes as outer peripheral parts of separators and are put on both side of an electrolyte membrane. In the membrane electrode structure, faces of the separator in contact with the electrodes are at a level higher than the faces on the periphery in contact with the gasket. The Document 1 also discloses that even when this results that a thin electrode membrane structure is employed, the gasket can be adequately compressed, and thereby gas in the fuel cell does not leak to the outside of the fuel cell.

Patent Document 2 discloses that liquid sealer is applied to grooves formed in the rims of separators, a pair of the separators holds an electrode membrane structure to squeeze the liquid sealer, and the liquid sealer is closely contacted with the end faces of gas diffusion layers of the electrode membrane structure to prevent reaction gas from flowing through the periphery of the electrode membrane structure.

SUMMARY OF INVENTION

Technical Problem

However, in the structure of Patent Document 1, the reaction gas may flow out through the periphery of the electrode membrane structure without flowing through a reaction surface, which results in a decrease in the power generation efficiency. That is, since there is a difference in level between the surfaces where the separators and the electrodes are in contact and the surfaces where the separators and the gasket are in contact, the shape of the gasket should be conformed to the step of the separators and the shape of the electrode membrane structure. However, when metal separators are used, it is difficult to form a sealing groove in the right angle. Furthermore, since the dimensional accuracy of the punched rubber gasket is poor, a gap is likely to be formed between the membrane electrode structure and the gasket.

In recent years, narrowing reaction gas channels has been a main stream measure for achieving higher performance of a fuel cell. In a fuel cell with narrow reaction gas channels, even a small gap between an electrode membrane structure and a gasket greatly increases the amount of reaction gas flowing out through the gap, which results in a decrease in the fuel efficiency.

FIG. 1 illustrates an example of the relationship between the distance between an electrode membrane structure and a sealing member and the flow volume of reaction gas flowing through the periphery of the electrode membrane structure without contributing to the power generation.

In a fuel cell of Patent Document 2, since a liquid sealer is squeezed by the separators and cured, the thickness of the sealing material incorporated in the fuel cell remains almost fixed to the free length of the sealing material. Therefore, the sealing material is not adequately compressed, and it is difficult to prevent gas leakage to the outside of the fuel cell.

The present invention has been made in view of the above-described problems with the related art, and it is an object of the present invention to provide a fuel cell electrode structure that can prevent reaction gas from not flowing on a reaction surface but flowing through the periphery of a membrane electrode assembly to decrease the power generation efficiency and, at the same time, that can also prevent leakage of gas or the like to the outside of the fuel cell, and to provide a metal separator, a fuel cell single cell using the fuel cell electrode structure and the metal separator, and a mold for producing the fuel cell electrode structure.

Solution to Problem

As a result of diligent studies to achieve the above-described object, the present inventors have found that the above-described object can be achieved by a sealing member of a fuel cell electrode structure includes an extended portion that extends to a membrane electrode assembly and a lip portion that is thicker than the extended portion, in which the end face of the extended portion is in contact with the end face of a gas diffusion layer of the membrane electrode assembly. The present invention has been thus completed.

That is, a fuel cell electrode structure of the present invention includes: a membrane electrode assembly in which an electrolyte membrane is disposed between a pair of electrodes; and a frame that is integrally formed with the membrane electrode assembly and supports the membrane electrode assembly from a peripheral side, wherein the membrane electrode assembly includes a gas diffusion layer on a surface, a sealing member is disposed on the frame and seals the periphery of the membrane electrode assembly, the sealing member at least partly includes an extended portion that extends to the membrane electrode assembly, in which the extended portion is thinner than a lip portion of the sealing member, and the end face of the extended portion is in contact with an end race of the gas diffusion layer, and the gas diffusion layer extends up to on the frame.

A metal separator of the present invention includes a flat portion clamping a contact portion where, in the above-described fuel cell electrode structure, the extended portion of the sealing member is in contact with the gas diffusion layer.

A fuel cell single cell of the present invention includes the above-described fuel cell electrode structure and a pair of metal separators that hold the fuel cell electrodes from both faces, wherein the metal separators include flat portions that compress the extended portion of the sealing member and a contact portion where the end face of the extended portion is in contact with the gas diffusion layer, and the flat portions of metal separators clamp around the contact portion from both faces.

A mold for molding the fuel cell electrode structure of the present invention is used for providing the sealing member to the frame that is integrally formed with the membrane electrode assembly and includes a portion being in contact with the frame of the membrane electrode assembly and a portion being in contact with the gas diffusion layer, wherein the mold clamps the membrane electrode assembly and compresses the gas diffusion layer so that the frame and the gas diffusion layer closes the mold to form a cavity with the shape of the sealing member.

A method for molding producing the fuel cell electrode structure includes: injecting the sealing member into a cavity that is formed by the above-described mold for molding the fuel cell electrode structure clamping the membrane electrode assembly, so as to provide the sealing member on the frame that is integrally formed with the membrane electrode assembly.

Advantageous Effects of Invention

In the fuel cell electrode structure of the present invention, the sealing member that seals the periphery of the membrane electrode assembly includes the extended portion that extends from the lip portion to the membrane electrode assembly, in which the extended portion is thinner than the lip portion, and the end face of the extended portion is in contact with the end face of the gas diffusion layer of the membrane electrode assembly. Therefore, the fuel cell electrode stricture of the present invention can close a path for reaction gas that flows on the periphery of the membrane electrode assembly.

The metal separator of the present invention includes the flat portion that compresses around the contact portion where the extended portion of the sealing member is in contact with the gas diffusion layer of the fuel cell electrode structure. Therefore, the metal separator of the present invention can close a path for reaction gas that flows on the periphery of the membrane electrode assembly.

In the fuel cell single cell of the present invention, the above-described fuel cell electrode structure is compressed and held from both faces by the metal separators that include flat portions for compressing around the contact portion where the extended portion of the sealing member is in contact with the gas diffusion layer of the fuel cell electrode structure. Therefore, a path for reaction gas that flows on the periphery of the membrane electrode assembly is closed. As a result, even when a gas channel is formed so as to be in a narrow rib shape, the reaction gas flows on the reaction surface of the membrane electrode assembly, which can boost the fuel economy and also prevent gas or the like from leaking out of the fuel cell.

In the mold for molding the fuel cell electrode structure of the present invention, the cavity with the shape of the sealing member is formed by clamping the membrane electrode assembly and compressing the gas diffusion layer so as to close the mold with the frame and the gas diffusion layer. Therefore, the mold of the present invention enables the sealing member to certainly bring into contact with the end face of the gas diffusion layer.

Further, in the method for producing the fuel cell electrode structure, the membrane electrode assembly is clamped to form the cavity, and then the sealing member is injected. Therefore, the sealing member is certainly brought into contact with the end face of the gas diffusion layer, and the sealing member does not flow into the reactive portion.

DESCRIPTION OF EMBODIMENTS

<Fuel Cell Electrode Structure>

The fuel cell electrode structure of the present invention will be described.

Figure 1:
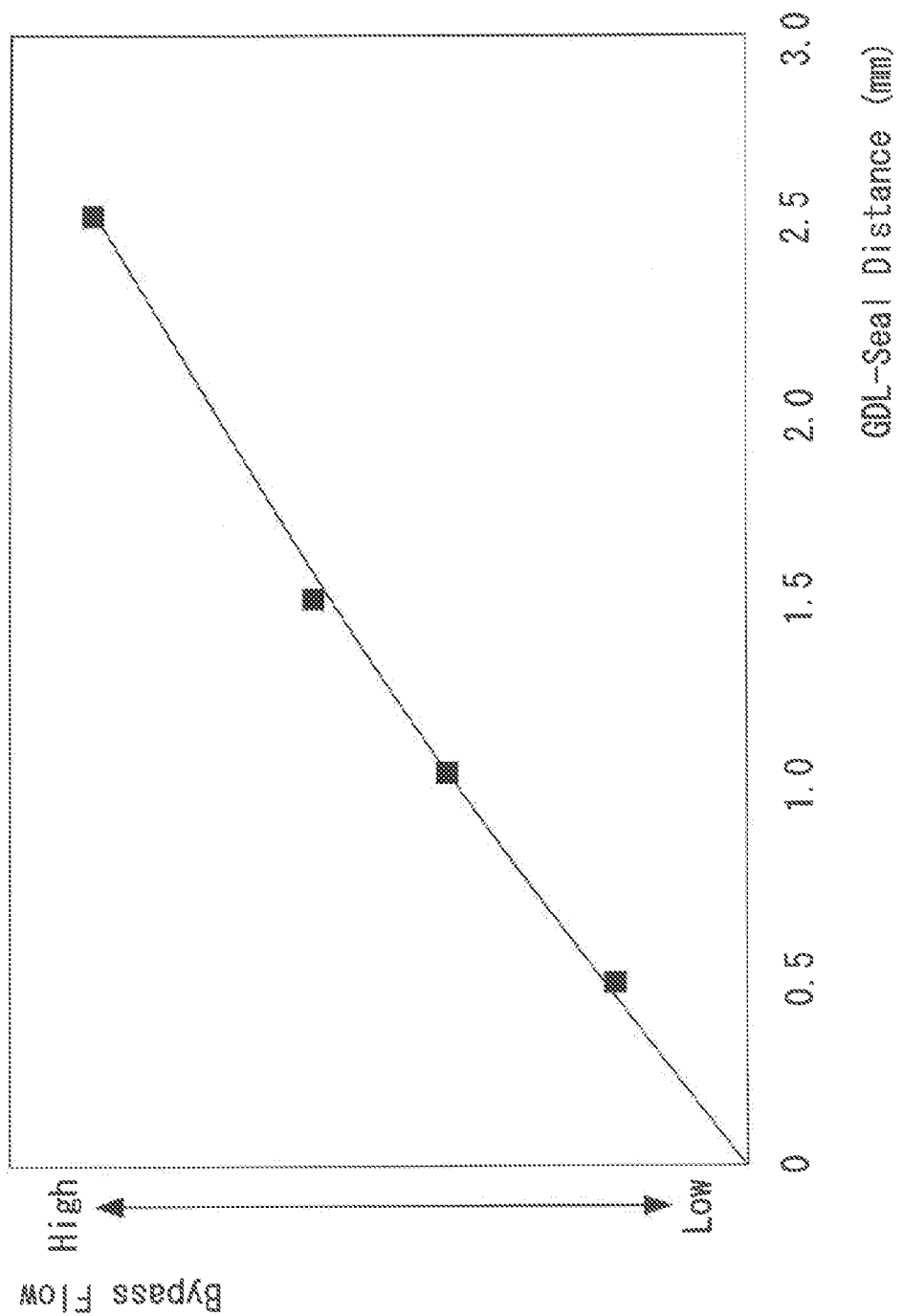
FIG. 1 is a graph illustrating an example of the relationship between the distance between an electrode membrane structure and a sealing member and the bypass flow volume of reaction gas that does not contribute to power generation.
Figure 2B:
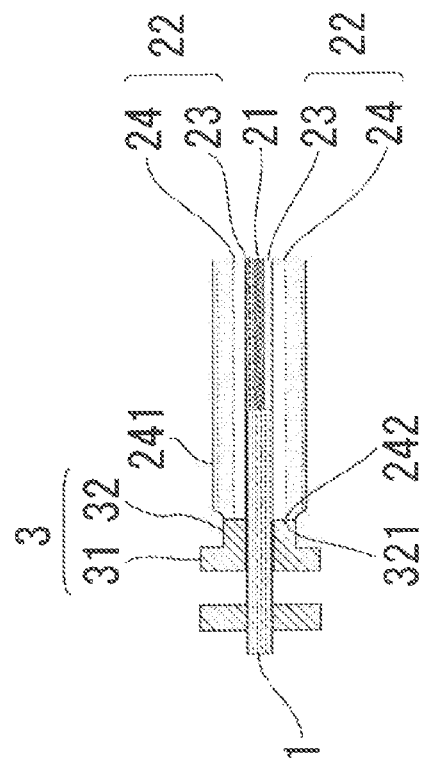
FIG. 2B is a cross sectional view taken along X-X' in FIG. 2A.
Figure 2A:
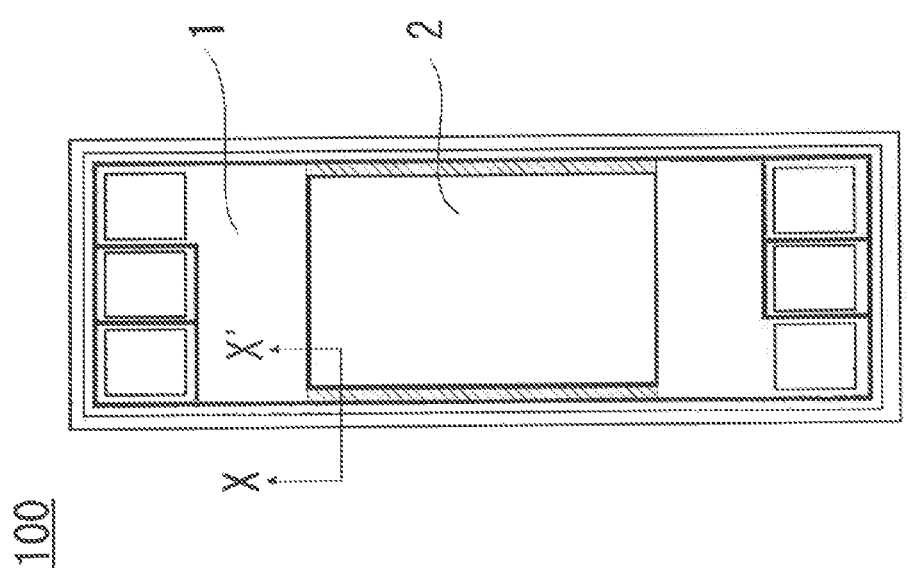
FIG. 2A is a plan view illustrating an example of a fuel cell electrode structure of the present invention.

An example of the fuel cell electrode structure 100 of the present invention is illustrated in FIGS. 2A and 2B. FIG. 2A is a plan view of the fuel cell electrode structure, and FIG. 2B is a cross sectional view taken along X-X' in FIG. 2A.

In the fuel cell electrode structure 100 of the present invention, a membrane electrode assembly 2 is integrally formed with a frame 1 that supports the membrane electrode assembly 2 from the peripheral side, and a sealing member 3 is provided on the frame 1 on the periphery of the membrane electrode assembly 2.

For example, the frame 1 is formed by a film made of polyester resin or the like. The membrane electrode assembly 2 is a so-called MEA in which an electrolyte membrane 21 made of a solid polymer is disposed between a pair of electrodes including an anode electrode layer 22 and a cathode electrode layer 22 as illustrated in FIG. 2B. In each of the electrode layers gas diffusion layer 24 is formed on the surface of a catalyst layer 23.

It is preferred that the gas diffusion layers 24 are designed to be larger than the electrolyte membrane 21 and the catalyst layers 23 and include extended portions 241 that extend onto the frame 1. The extended portions 241 prevent a decrease of a reaction surface due to sealing members, which is described below.

The sealing members 3, which are provided on the periphery of the membrane electrode assembly 2, are provided on the frame. Each of the sealing members 3 includes a lip portion 31 and an extended portion 32 that is flat and extends from the lip portion 31 to the membrane electrode assembly 2.

The extended portion 32 is thinner than the lip portion 31 and the end face 321 of the extended portion 32 is in contact with the end face 242 of the gas diffusion layer on the frame 1.

Accordingly, a path for reaction gas between the outer edge of the membrane electrode assembly 2 and the sealing members 3 are closed, and the reaction gas does not flow through the periphery of the membrane electrode assembly 2.

As long as at least partly including the extended portion 32, the sealing member 3 can prevent such bypass flow of the reaction gas. Thus, it is not required that the extended portion 32 is provided throughout the sealing member 3.

Since the lip portion 31 is thicker than the extended portion 32, the sealing member 3 has an adequate free length. Therefore, the sealing property of the sealing member 3 is improved, and the fuel cell electrode structure with the above sealing member can close the path on the periphery of the membrane electrode assembly and also prevent gas from leaking to the outside of the fuel cell.

The sealing members on the left side in FIG. 2B are provided as a backup in order to prevent gas leakage from the fuel cell more completely.

For example, the sealing members 3 may be made of a rubber material such as ethylene-propylene-diene rubber (EPDM), nitrile rubber (NBR), fluororubber, silicone rubber, fluorosilicone rubber, butyl rubber, natural rubber, styrene rubber, chloroprene rubber or acrylic rubber.

<Production of Fuel Cell Electrode Structure>

The above-described fuel cell electrode structure can be produced by providing the sealing members 3 to the frame 1 that are integrally formed with the membrane electrode assembly 2. The sealing members 3 are preferably provided by infection molding.

Figure 3:
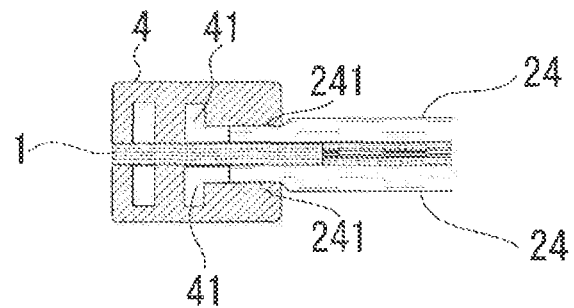
FIG. 3 is a cross sectional view of an example of a mold for providing a sealing member.

FIG. 3 is a cross sectional view of an example of a mold for molding the fuel electrode structure used in injection molding. A mold 4, which is used for providing the sealing members to the frame that is integrally formed with the membrane electrode assembly, is dividable into two or more pieces.

The mold 4 includes a portion to come in contact with the frame of the membrane electrode assembly and a portion to come in contact with the gas diffusion layers. By clamping the end part of the membrane electrode assembly in the direction perpendicular to the plane of the membrane electrode assembly and compressing the end part of the membrane electrode assembly, the mold 4 comes in contact with frame 1 and is closed by the frame and the membrane electrode assembly so that a cavity 41 with the shape of the scaling member, i.e. a L-shaped cross section, is formed as illustrated in FIG. 3.

Then, the sealing member is provided by injecting the above-described rubber material of the scaling member into the cavity 41. The fuel cell electrode structure in which the end face of the extended portion of the sealing member comes in contact with the end face of the gas diffusion layer is thus produced.

In the mold, it is preferred that the portion that comes in contact with the gas diffusion layer clamps the extended portions 241, which is a portion of the gas diffusion layer of the membrane electrode assembly 2 that extends up to on the frame. Since the extended portion 241 does not include a reactive portion of the membrane electrode assembly 2, i.e. the electrolyte membrane 21 and the electrode layer 22, even when the sealing member penetrates into the gas diffusion layer, the reaction area is not decreased and then the power generation performance is not influenced.

The compressive stress of the membrane electrode assembly 2 clamped by the mold 4 is preferably within the range of 0.3 MPa to 5.0 MPa, although it depends on the thickness of the gas diffusion layer and the like. When the compressive stress is within the above range, the gas diffusion layer is adequately compressed. Even when an injection pressure is applied, the sealing member stops at the end face of the gas diffusion layer, and the sealing member does not penetrate into the reaction area of the membrane electrode assembly 2. Therefore, it is possible to prevent a decrease of the reaction area.

<Fuel Cell Single Cell>

Figure 4:
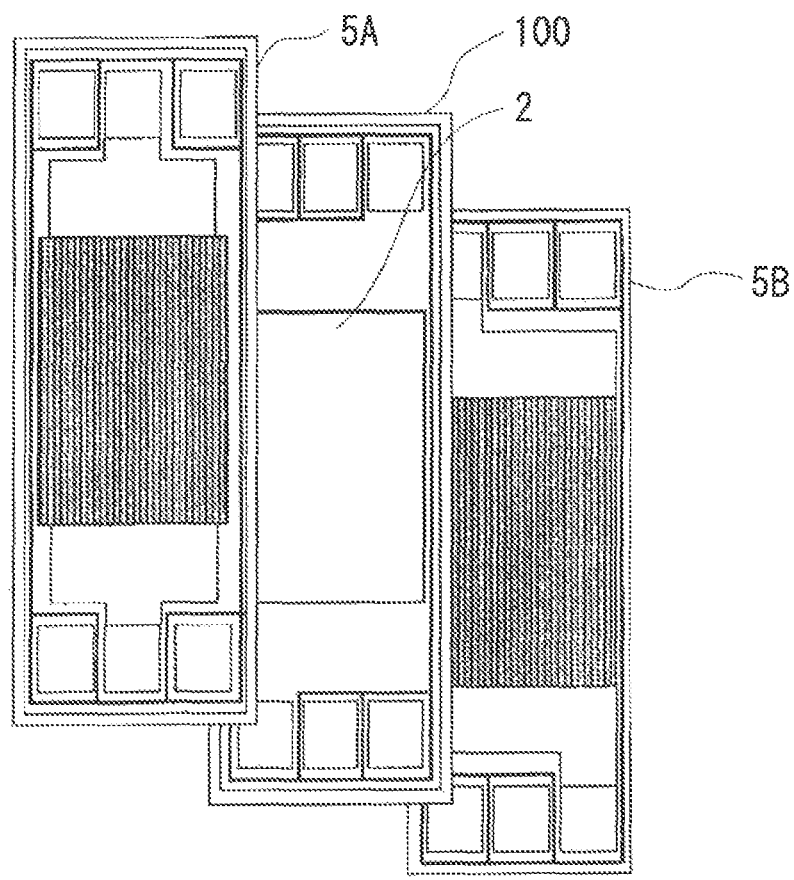
FIG. 4 is a plan view of a fuel cell single cell in an exploded state.

The fuel cell single cell C of the present invention includes the fuel cell electrode structure 100 and a pair of metal separators 5A, 5B that hold the fuel cell electrode structure 100 from the both faces, as illustrated in FIG. 4.

The pair of metal separator 5A, 5B, which are metal plates that are made of stainless steel or the like formed by, for example, press working, include corrugated plates that have front and back faces with mutually reversed shapes. That is, in the fuel cell single cell, a rib and a groove on the inner side reversely correspond to a groove and a rib of the outer side, respectively.

Figure 5:
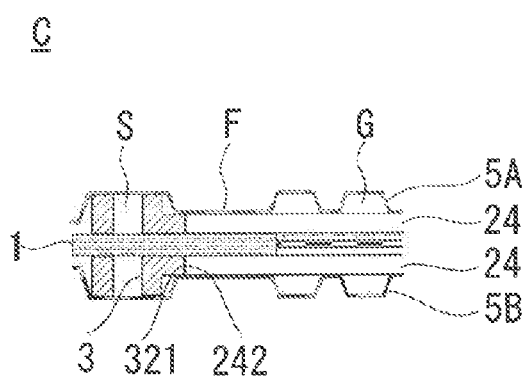
FIG. 5 is a cross sectional view of a main part of a the cell single cell.

On the inner side of the fuel cell single cell, which is the side facing the membrane electrode assembly 2 of a reactive portion, the rib of each of the pair of metal separators 5A, 5B is in contact with the membrane electrode assembly 2 while the groove forms a gas channel G as illustrated in FIG. 5. Meanwhile, on the outer side of the filet cell single cell, cooling medium channel is formed.

On the periphery of the membrane electrode assembly 2, the groove forms sealing groove S in which the sealing member 3 of the fuel cell electrode structure are disposed, and the rib between the gas channel G and the sealing groove S forms flat portion F.

The flat portions F clamp the contact portions between the extended portions of the sealing members and the gas diffusion layers, to compress the gas diffusion layers, so as to align the extended portions and the gas diffusion layers to the same level.

In the present invention, the extended portion of the sealing member is in contact with the gas diffusion layer, and the contact portions are clamped by the frame and the metal separators. Therefore, the reaction gas does not flow out through the periphery of the electrode membrane structure, and then it is possible to improve the stoichiometric ratio—voltage characteristic (SR characteristic) and the fuel economy performance.

REFERENCE SIGNS LIST

1 Frame
2 Membrane electrode assembly
21 Electrolyte membrane
22 Electrode layer
23 Catalyst layer
24 Gas diffusion layer
241 Extended portion
242 End face
3 Sealing member
31 Lip portion 32 Extended portion
321 End face
4 Mold
41 Cavity
5A, 5B Metal separator
C Fuel cell single cell
G Gas channel
S Sealing groove
F Flat portion
100 Fuel cell electrode structure

CITATION LIST

Patent Literature

Patent Document 1: JP 2003-163015A
Patent Document 2: JP 2001-319667A

The invention claimed is:

1. A fuel cell electrode structure comprising:
a membrane electrode assembly including an electrolyte membrane between a pair of electrodes; and
a frame being integrally formed with the membrane electrode assembly and supporting the membrane electrode assembly from a peripheral side, wherein
the membrane electrode assembly comprises a gas diffusion layer on a surface,
a sealing member is disposed on the frame and seals a periphery of the membrane electrode assembly,
the sealing member comprises a lip portion and an extended portion that extends to the membrane electrode assembly,
the extended portion is thinner than the lip portion and is at least partly in contact with an end face of the gas diffusion layer, and
the gas diffusion layer extends to overlap with the frame.

2. A metal separator for holding the fuel cell electrode structure according to claim 1,
wherein the metal separator comprises a flat portion configured to clamp a contact portion where the extended portion of the sealing member is in contact with the gas diffusion layer.

3. A fuel cell single cell comprising the fuel cell electrode structure according to claim 1, and a pair of metal separators that hold the fuel cell electrode structure from both faces, wherein
each metal separator comprises a flat portion configured to clamp a contact portion where the extended portion is in contact with the gas diffusion layer, and
the flat portions of the metal separators clamp the contact portion from both faces.

4. The fuel cell electrode structure according to claim 1, wherein
the lip portion is perpendicular to the extended portion.

5. The fuel cell electrode structure according to claim 1, wherein
an end face of the extended portion is in contact with the end face of the gas diffusion layer.

6. The fuel cell electrode structure according to claim 5, wherein
a thickness of the end face of the extended portion and a thickness of the end face of the gas diffusion layer are equal.

7. The fuel cell electrode structure according to claim 1, wherein
a thickness of the gas diffusion layer is tapered such that a thickness of the end face of the gas diffusion layer is less than a thickness of a portion of the gas diffusion layer in contact with the membrane electrode assembly.

8. The fuel cell electrode structure according to claim 1, wherein
each of the pair of electrodes comprises the gas diffusion layer and a catalyst layer, and
the catalyst layer is provided between the gas diffusion layer and the electrolyte membrane.

9. The fuel cell electrode structure according to claim 8, wherein
an end face of the electrolyte membrane is in contact with an end face of the frame,
an end face of the catalyst layer is in contact with an end face of the frame, and
the gas diffusion layer includes an extended portion that extends past the end face of the electrolyte membrane and the end face of the catalyst layer, the extended portion overlapping with the frame.

10. The fuel cell electrode structure according to claim 1, wherein
the gas diffusion layer overlaps with the electrolyte membrane and the frame.

11. A fuel cell electrode structure comprising:
a membrane electrode assembly including an electrolyte membrane between a pair of electrodes; and
a frame being integrally formed with the membrane electrode assembly and supporting the membrane electrode assembly from a peripheral side, wherein
the membrane electrode assembly comprises a gas diffusion layer on a surface,
a seal is disposed on the frame and seals a periphery of the membrane electrode assembly, and
the gas diffusion layer extends to overlap with the frame.

* * * * *